United States Patent
Moyer et al.

(10) Patent No.: US 9,387,429 B2
(45) Date of Patent: Jul. 12, 2016

(54) HYDROCARBON TRAP ASSEMBLY WITH THERMOFORMED HYDROCARBON-ADSORBING SLEEVE

(71) Applicant: Ford Global Technologies, LLC, Dearborn, MI (US)

(72) Inventors: David S. Moyer, Sterling Heights, MI (US); Ha To Chung, Canton, MI (US); Matthew J. Rimmel, Northville, MI (US); Roger Khami, Troy, MI (US); Andrew George Bellis, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 181 days.

(21) Appl. No.: 14/025,885

(22) Filed: Sep. 13, 2013

(65) Prior Publication Data

US 2015/0075500 A1    Mar. 19, 2015

(51) Int. Cl.

| | |
|---|---|
| *F02M 35/10* | (2006.01) |
| *F02M 33/02* | (2006.01) |
| *F02M 37/20* | (2006.01) |
| *B01D 53/04* | (2006.01) |
| *F02M 25/08* | (2006.01) |
| *F02M 35/02* | (2006.01) |

(52) U.S. Cl.
CPC ....... *B01D 53/0407* (2013.01); *F02M 25/0872* (2013.01); *F02M 35/0218* (2013.01); *F02M 35/10144* (2013.01); *B01D 2257/702* (2013.01); *B01D 2259/4516* (2013.01)

(58) Field of Classification Search
CPC .......... F02M 25/0854; F02M 25/0872; F02M 35/10242; F02M 35/1036; B01D 53/0407; B01D 2257/702; B01D 2259/4516

USPC ............... 123/184.21, 516, 519; 55/385.3
See application file for complete search history.

(56) References Cited

U.S. PATENT DOCUMENTS

| | | | |
|---|---|---|---|
| 4,542,922 A * | 9/1985 | Grossauer | F16L 25/0045 |
| | | | 285/320 |
| 6,997,977 B2 | 2/2006 | Dallas et al. | |
| 7,344,586 B2 | 3/2008 | Zulauf et al. | |
| 7,641,720 B2 | 1/2010 | Li | |
| 7,708,817 B2 | 5/2010 | Hurley et al. | |
| 8,191,535 B2 | 6/2012 | Bellis et al. | |
| 2003/0192512 A1* | 10/2003 | Luley | F02M 33/02 |
| | | | 123/519 |
| 2004/0099253 A1 | 5/2004 | Tschantz | |
| 2004/0112219 A1* | 6/2004 | Leffel | B01D 53/0415 |
| | | | 96/108 |
| 2008/0093846 A1* | 4/2008 | Sparks et al. | 285/330 |

(Continued)

FOREIGN PATENT DOCUMENTS

JP         2006037865    *   2/2006

*Primary Examiner* — Lindsay Low
*Assistant Examiner* — Syed O Hasan
(74) *Attorney, Agent, or Firm* — Greg P. Brown; Brooks Kushman P.C.

(57) ABSTRACT

A hydrocarbon trap assembly for use in an intake system of a motor vehicle engine includes a first duct having an interior recess adjacent an end thereof, the recess having a blind end; a second duct overlapping the first duct's end and closing off a second end of the recess; and a thermoformed hydrocarbon-adsorbing sleeve inside the recess and having a first edge adjacent the blind end and a second edge adjacent the second end of the recess. One or both ends of the sleeve may engage a hook formed on the respective first and/or second ducts. The second end of the sleeve may have a flange that fits into a gap between the ducts.

14 Claims, 5 Drawing Sheets

(56) References Cited

U.S. PATENT DOCUMENTS

2008/0282793 A1* 11/2008 Jirskog ............... G01F 23/284 73/292

2009/0282793 A1* 11/2009 Tomlin ............... F02M 25/0854 55/385.3

2013/0291839 A1 11/2013 Lin et al.

* cited by examiner

HYDROCARBON TRAP ASSEMBLY WITH THERMOFORMED HYDROCARBON-ADSORBING SLEEVE

TECHNICAL FIELD

The present disclosure relates to a hydrocarbon trap as used in an air intake system of an engine.

BACKGROUND

Hydrocarbon (HC) vapor traps are used in internal combustion engines to capture hydrocarbon vapors which may emanate from the interior of the engine and would otherwise leak into the environment. HC traps therefore are part of a vehicle's pollution control system, reducing potentially harmful evaporative emissions from the engine.

U.S. patent application Ser. No. 13/657,544 filed on Oct. 22, 2012, by the owner of this Application (the disclosure of which is incorporated herein by reference) discloses a HC vapor trap including one or more layers or sheets of a polymeric material impregnated with a HC vapor adsorption/desorption material. The layer or layers of the polymeric material may be formed to a desired shape by heat and/or pressure in a process referred to as thermoforming. The use of thermoformed polymeric material sheets provides structural integrity to the HC trap while retaining the adsorption/desorption functionality via the impregnated HC vapor adsorption/desorption material. The improved structural integrity allows a vapor trap assembly to be constructed with a reduced need for additional components to retain the trap material in its operative position

SUMMARY

In a first embodiment disclosed herein, a hydrocarbon trap assembly for use in an intake system of a motor vehicle engine comprises a first duct having an interior recess adjacent an end thereof, the recess having a blind end; a second duct overlapping the first duct's end and closing off a second end of the recess; and a thermoformed hydrocarbon-adsorbing sleeve inside the recess and having a first edge adjacent the blind end and a second edge adjacent the second end of the recess.

In another embodiment, the sleeve comprises a stiffening feature formed by the thermoforming process.

In another embodiment, the stiffening feature comprises a flange adjacent the second edge, the flange fitting into a gap between the two duct ends.

In another embodiment, the stiffening feature comprises a depression formed in at least one of an outer and inner surface of the sleeve.

In another embodiment, the depression is formed in the outer surface and matingly engages a feature projecting from an inner surface of the first duct.

In another embodiment, the feature projecting from the inner surface of the first duct is a clearance feature for an obstruction exterior to the first duct.

In another embodiment, the stiffening feature protrudes from the outer surface and matingly engages a complementally-shaped feature in an inner surface of at least one of the ducts.

In another embodiment, at least one of the ducts comprises a hook overlapping a portion of the recess to form a pocket receiving the edge of the sleeve.

In another embodiment, the sleeve has a relief around at least a portion of an inner surface adjacent one of the edges, the hook and the relief overlapping one another.

In another embodiment, the first duct has a protrusion extending into the recess and the sleeve has a retaining feature in mating engagement with the protrusion.

In another embodiment, wherein the protrusion is an axial ridge and the retaining feature is an axial gap.

In another embodiment, a hydrocarbon trap assembly comprises a first duct having an interior recess adjacent an end thereof and a first hook extending over at least a portion of a blind end of the recess to form a first pocket; a second duct joined to the first duct's end to close off a second end of the recess, the second duct having a second hook extending over at least a portion of an end of the recess opposite the blind end to form a second pocket; and a thermoformed hydrocarbon-adsorbing sleeve inside the recess and having a first edge retained by the first pocket and a second edge retained by the second pocket.

In another embodiment, a hydrocarbon trap assembly, comprises a first duct having an interior recess adjacent an end thereof and a first hook extending over at least a portion of a blind end of the recess to form a pocket; a second duct joined to the first duct's end to close off a second end of the recess and form a gap between the first duct and the second; and a thermoformed hydrocarbon-adsorbing sleeve inside the recess and having a first edge disposed in the first pocket and a second edge having a flange fitting into the gap.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
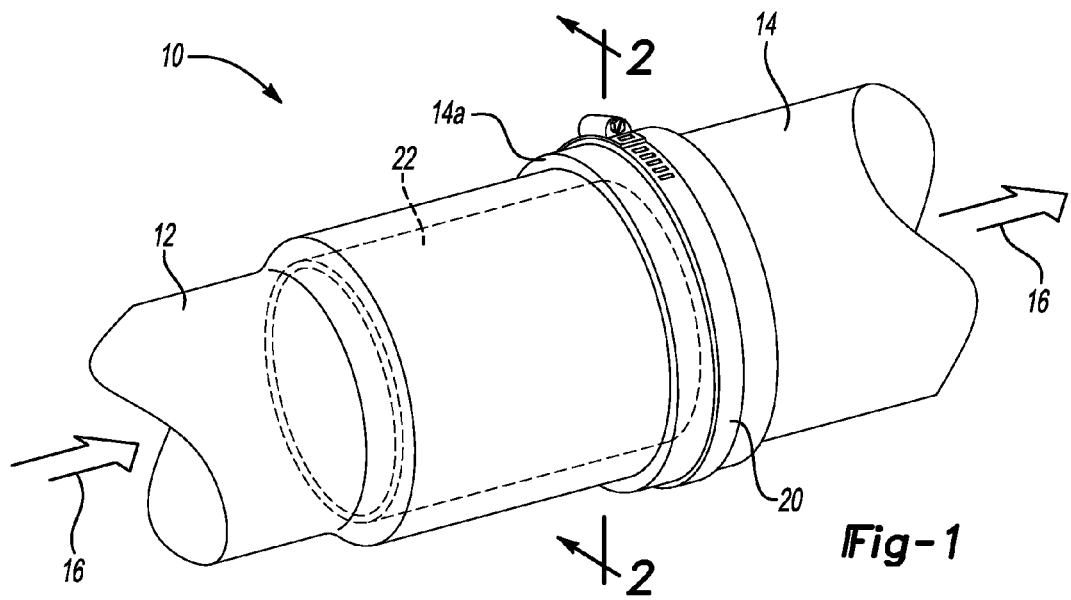
FIG. 1 shows a schematic depiction of a hydrocarbon trap assembly.

FIG. 1 schematically shows a portion of an engine air induction system 10 comprising a first duct 12 and a second duct 14 joined with one another to permit flow of intake air in an axial direction as indicated by arrows 16. As is apparent to a person of skilled in the automotive arts, air induction system 10 may be located at an appropriate point upstream of one or more combustion chambers (not shown) of an engine. Second duct 14 has an outwardly flared or belled end 14a that fits over the end of first duct 12 in an overlapping manner as shown. First and second ducts 12, 14 may be secured to one another by a tension band 20 or by any appropriate alternative means such as a band clamp, mechanical snap-fit, welding, or adhesive. As is well known in the art, first and second ducts 12, 14 may be formed from any appropriate material or materials, with commonly-used materials including thermoplastics, thermoplastic elastomers, elastomers, and/or metals. A hydrocarbon-adsorbing sleeve 22 is retained inside the end of the first duct 12 adjacent to its end where it connects with second duct 14, as described in greater detail below.

Sleeve 22 is preferably formed from a stack of consecutively layered polymeric sheets, at least a portion of the sheets impregnated with a HC vapor adsorption/desorption material. The polymeric material may be non-woven polyester and the HC vapor adsorption/desorption material may be activated carbon, in some examples. Additionally or alternatively, the HC vapor adsorption/desorption material may include carbon, activated carbon, zeolites, hydrophobic cellulose, silicon oils, cyclodextrins, and/or any other suitable adsorption/desorption material.

Figure 2:
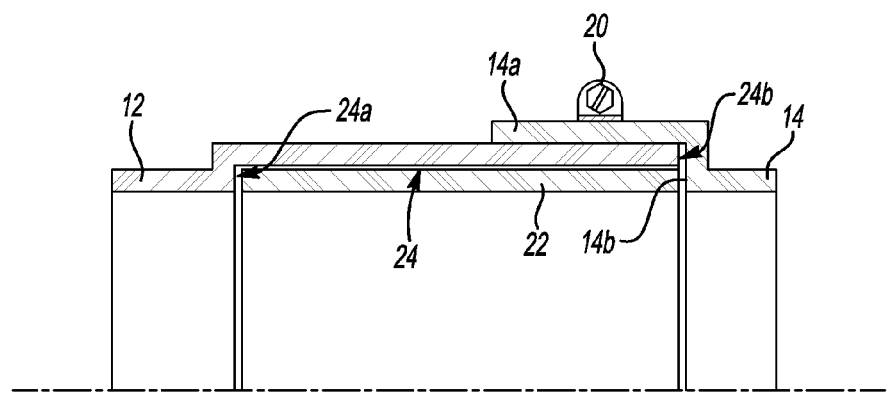
FIG. 2 shows a cross-sectional view taken perpendicular to line 2-2 of FIG. 1.

FIG. 2 schematically shows an interior recess 24 formed within first duct 12 adjacent the end of the duct that is encircled by second duct end 14a. First duct 12 may have an outwardly flared or belled end, as shown, such that the wall thickness of the first duct remains generally constant in the portion forming recess 24 and the portion adjacent thereto. Alternatively, the exterior diameter of the first duct may remain constant (not shown) with the wall thickness of the duct in the area of the recess being thinner than the adjacent portion.

Recess 24 has a blind end 24a (at the left end of the recess, as shown in FIG. 2) and an open end 24b (at the right end, as shown in FIG. 2), the open end being closed off by a ledge 14b of second duct 14 when the two ducts are joined with one another. Hydrocarbon-adsorbing sleeve 22 fits inside the recess 24 and is shown as having a thickness not significantly greater than the radial depth of the recess so that the sleeve does not project radially inward to a position where it may undesirably obstruct the flow of intake air through ducts 12, 14. In some cases, it may be desirable or necessary for the sleeve to be thicker than the radial depth of the recess, in which case the sleeve will project into the airflow. During assembly of induction system 10, the sleeve 22 is first inserted into recess 24, and second duct end 14a is then placed over the opening of the first duct 12 and secured thereto with, for example, tension ring 20.

In the FIG. 2 embodiment, hydrocarbon-adsorbing sleeve 22 is sufficiently rigid, by virtue of the particular material, geometry, and/or the thermoforming process used in its manufacture, to retain its cross-sectional shape matching the interior shape of the recess 24 so that the sleeve will not become dislodged from its operative position in the recess. The sleeve is retained against movement to the right (as viewed in FIG. 2) motion by ledge 14b. Thermoforming of single or multiple polymeric material sheets provides structural integrity to the HC trap while retaining the adsorption/desorption functionality via the impregnated HC vapor adsorption/desorption material.

Figure 3:
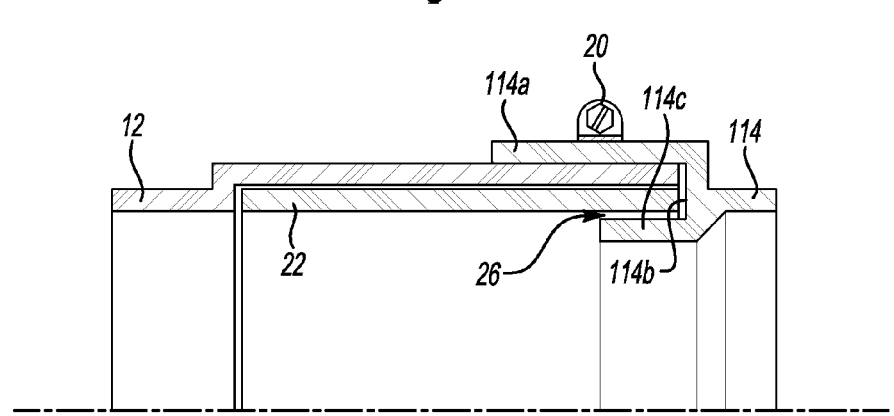
FIG. 3 shows a cross-sectional view of a second embodiment of a hydrocarbon trap assembly with a hook on one of the ducts retaining the hydrocarbon-adsorbing sleeve.

Turning now to FIG. 3, an alternative embodiment of the trap assembly is shown to include a second duct 114 similar to that shown in FIG. 2 in that it has a flared end 114a and a ledge 114b. Second duct 114 differs from that of the FIG. 2 embodiment in that a hook 114c projects axially toward first duct 12 to form a pocket 26 at the end of recess 24, ledge 114b defining the end of the pocket. Pocket 26 receives and retains the right axial edge of the sleeve 22 to positively locate and/or retain the sleeve in the recess 24 to prevent it from becoming dislodged after assembly. Hook 114c may extend around all of or only a portion of the circumference of recess 24.

Figure 4:
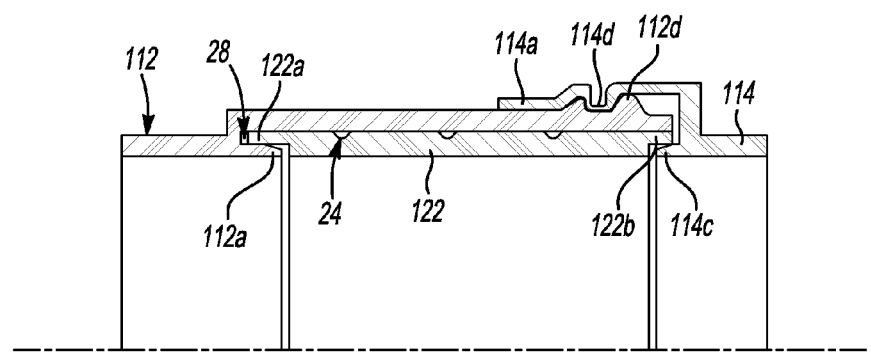
FIG. 4 shows a cross-sectional view of another embodiment of a hydrocarbon trap assembly with a hook on both ducts retaining the hydrocarbon-adsorbing sleeve.

FIG. 4 shows another embodiment of a hydrocarbon trap assembly in which first duct 112 has a hook 112a projecting axially to overlap the recess 24 and create a pocket 28. Hook 112a may extend around all of or only a portion of the circumference of recess 24. Sleeve 122 has first and second circumferential reliefs 122a and 122b formed around the interiors of its axial edges. Reliefs 122a, 122b are configured to overlap with the hooks 112a, 114c respectively to positively locate and/or retain the sleeve in the recess 24. The components may also be dimensioned so that the sleeve 122 does not project radially inward beyond hooks 112a, 114c to avoid obstruction of the flow of intake air through ducts 112, 114 (as described above in relation to the FIG. 2 embodiment). Compression of the sleeve material to form the reliefs results in localized stiffening and thus increases the overall structural integrity of the sleeve 22. The dual hook retention of the sleeve eliminates components and/or manufacturing and/or assembly steps that have been necessary in prior art designs. For example, it may eliminate the need of a supporting structure (such as an internal cage or external sleeve, etc.) for rigidity/support. In another example, it may further eliminate the need of heat stake, weld, screws, push pins, rivets, staples, etc. for assembly/attachment/retention/alignment/orientation.

FIG. 4 also shows an alternative structure for securing ducts 112 and 114 using a mechanical snap-fit. Features 112d and 114d formed on first duct 112 and second duct 114 respectively fit into a secure, mating relationship with one another when flared end 114a of the second duct is pushed over the end of the first duct.

Figure 5:
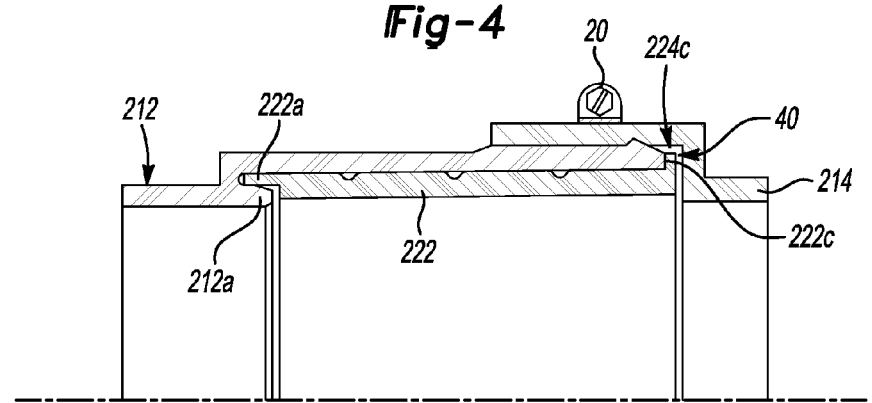
FIG. 5 shows a cross-sectional view of another embodiment of a hydrocarbon trap assembly with a welded tube end face.

FIG. 5 shows a further embodiment in which the right axial edge of a sleeve 222 has an outwardly projecting flange 222c which fits into an axial gap 224c between the end of first duct 212 and the interior surface 214 of second duct 214. One or more welds 40 may be used to bond the three components 212, 214, 222 where flange 222c fits into gap 224c. As is well known in the art, welds 40 may be of any type appropriate for the material(s) being joined, such as thermal, ultrasonic, or chemical. A single weld 40 may extend around the full circumference of the assembly, or discrete welds may be formed at one or more points or areas around the circumference.

Weld(s) 40 at this location provide(s) a tamper proof or tamper evident joining of the components. The left axial edge of the sleeve 222 is shown with a relief 222a engaging hook 221a in a manner similar to the embodiment of FIG. 4. Any of the other sleeve/recess configurations shown in FIGS. 2-4 may be used at the left edge of the sleeve.

Figure 6:
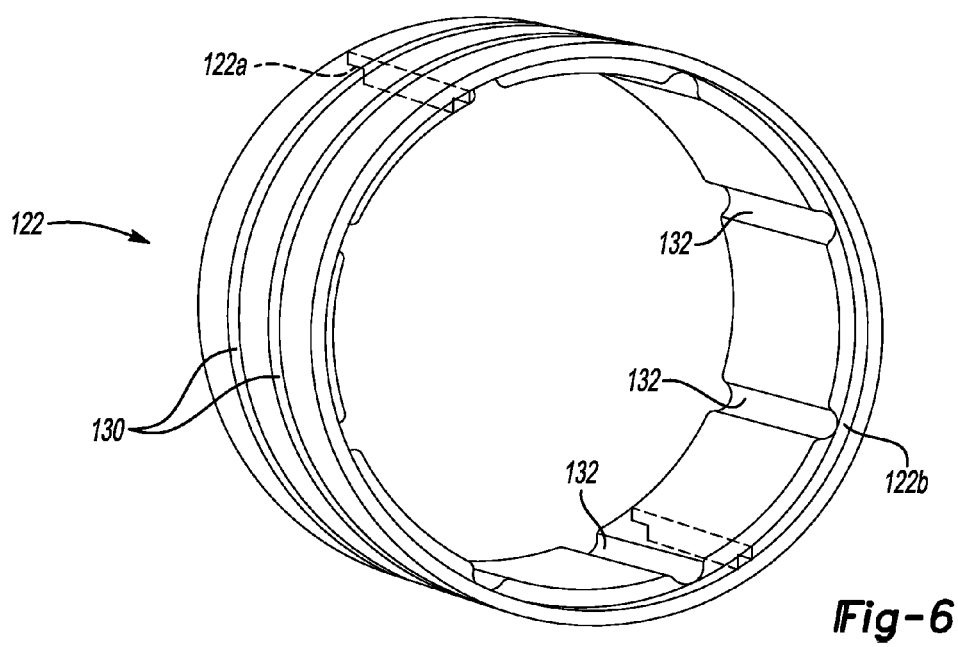
FIG. 6 shows a perspective view of the hydrocarbon-adsorbing sleeve used in the trap assembly of FIG. 4.

FIG. 6 shows a hydrocarbon-adsorbing sleeve 122 such as may be used in the embodiment of FIG. 4. Sleeve 122 is shown as a generally circular cross-section and thus would be appropriate for use in a duct 12 having an annular recess 24 with a circular cross-section. This relationship is inclusive of all duct cross-sectional geometries including but not limited to oval, ovoid, square, trapezoid, etc. Sleeve 122 has stiffening features created during fabrication of the sleeve by a thermoforming process in which one or more sheets of polymeric material are inserted into mating dies (not shown) and subjected to heat and pressure. Such stiffening features may include depressions such as circumferential grooves 130 formed in an exterior surface of the sleeve, axial grooves 132 formed in an interior surface of the sleeve, and/or reliefs 122a, 122b formed around all or selected portions of the one or both axial edges of the sleeve. In the thermoforming process, compression of the polymeric material to form the depressions results in the sheets of material in the depressed areas being thermally coupled together. This creates localized stiffening of the material which serves to increase the overall structural integrity of the sleeve 122.

The stiffening features 130, 132, 122a, 122b thereby contribute to the ability of the sleeve to maintain its desired shape and position within the recess. The exterior circumferential grooves 130 and axial interior grooves 132 are by way of example only, as depressed and/or raised features (protrusions) may be formed in any desired configuration to provide the required degree of stiffness of the sleeve.

Figure 7:
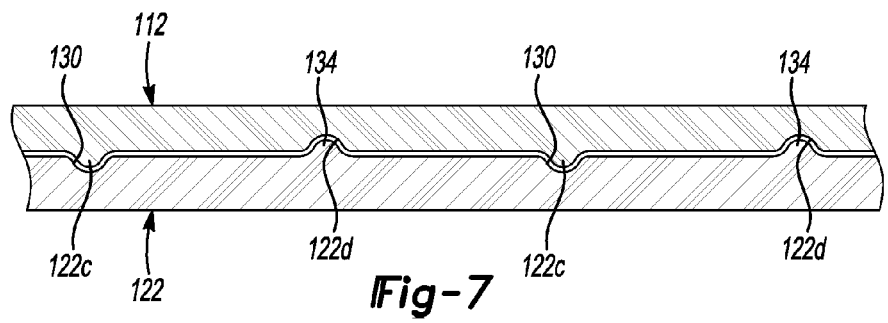
FIG. 7 shows a schematic cross-sectional view along axial center-line of a portion a hydrocarbon trap assembly.

Stiffening features formed on the outer surfaces of the sleeve 122 (such as grooves 130 and/or features projecting from the outer surface) may also serve to maintain the sleeve in proper position or alignment within the recess. As shown schematically in FIG. 7, this may be achieved by forming complementally-shaped features on the interior surface of the first duct 112, the duct features mating with the features formed in the outer surface of the sleeve 122. Complementally-shaped features may include, for example, a protrusion 122c to mate with a groove 130 (or other depression) in sleeve 122 and/or a depression 122d to mate with a protrusion 134 on the sleeve.

Figure 8:
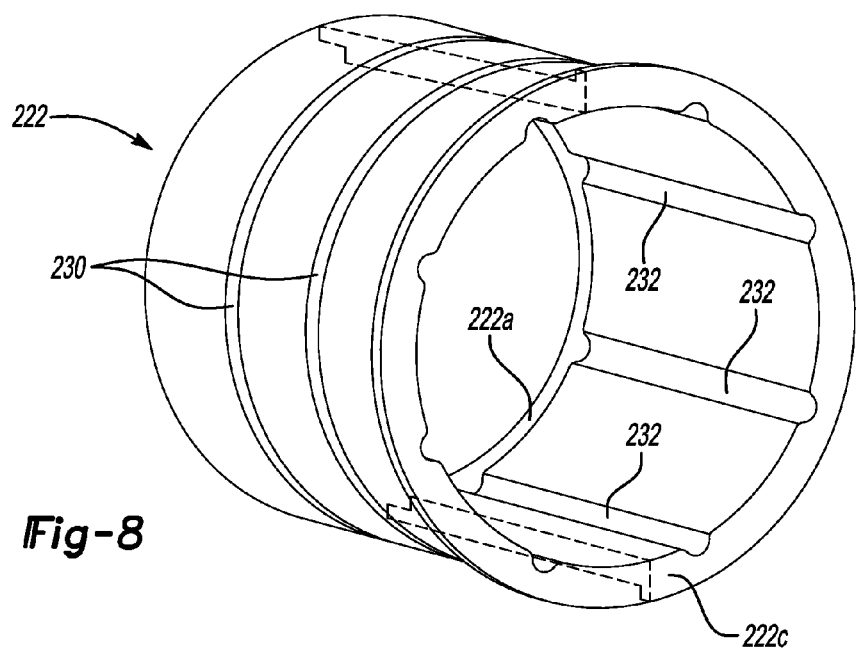
FIG. 8 shows a perspective view of a hydrocarbon-adsorbing sleeve used in the trap assembly of FIG. 5.

FIG. 8 shows a hydrocarbon-adsorbing sleeve 222 such as may be used in the embodiment of FIG. 5. Sleeve 222 has a flange 222c and a relief 222a formed at opposite edges thereof. Circumferential grooves 230 and axial grooves 232 are shown formed in the interior and exterior surfaces by way of example of the various stiffening and/or alignment features that may be formed by the thermoforming process. As discussed above in relation to FIG. 7, grooves 230, 232 may also serve as locating/aligning features when complementally-shaped features are provided on the interior surface of the recess with which the sleeve 222 is intended for use.

Figure 9:
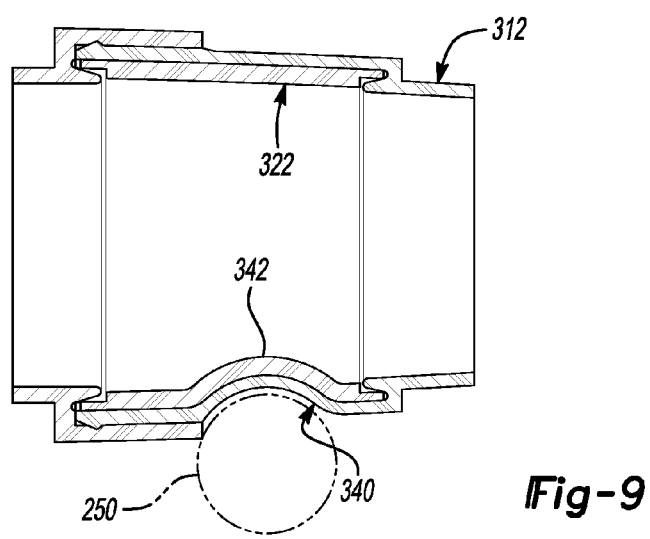
FIG. 9 shows a cross-sectional view of another embodiment of a hydrocarbon trap assembly with a clearance feature.

In an embodiment shown in FIG. 9, first duct 312 is formed with a clearance feature 340 projecting inwardly. Clearance feature 340 may be necessary, for example, to provide clearance for an obstruction 250 located in the vicinity of the air induction system that conflicts with what would otherwise be a regular shape of the duct. Sleeve 322 is formed with a complementally-shaped feature 342 that fits into mating engagement with the clearance feature 340. The engagement between the two features 340, 342 may also serve to provide a positive orientation feature maintaining the sleeve 322 in the desired position within duct 312.

Figure 10:
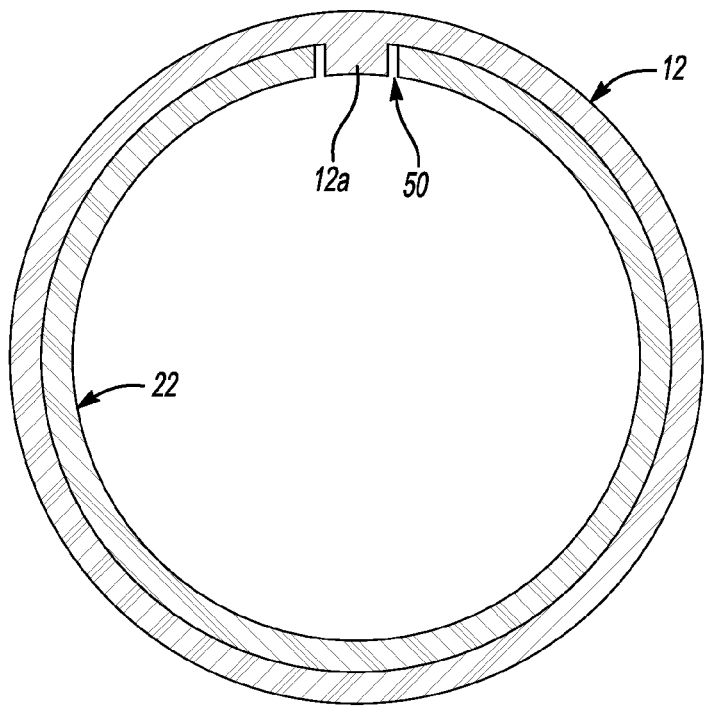
FIG. 10 shows a cross-sectional view of another embodiment of a hydrocarbon trap assembly with alignment/orientation features.

FIG. 10 illustrates a further embodiment in which a hydrocarbon-adsorbing sleeve 22 has a gap 50 extending along all or part of its axial length. Gap 50 fits into engagement with a complementally-shaped alignment feature such as ridge 12a projecting inwardly from an interior surface of duct 12.

Figure 11:
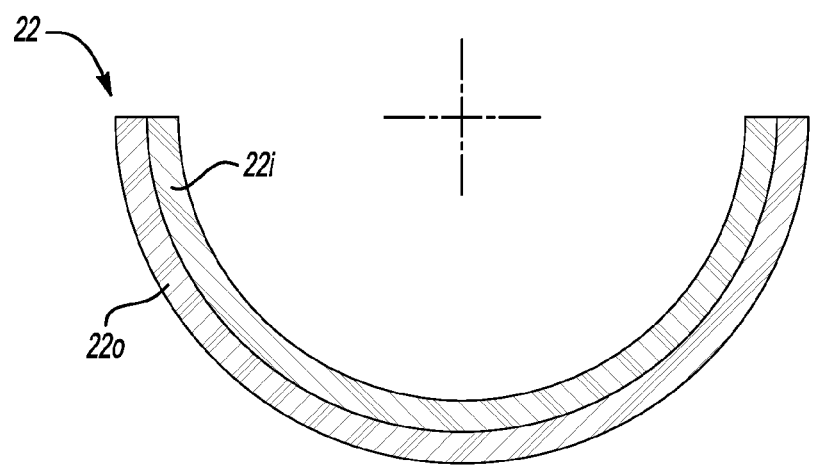
FIG. 11 shows a hydrocarbon-adsorbing sleeve formed from two layers of material and having a semi-circular cross-section.

FIG. 11 illustrates a further embodiment of a hydrocarbon-adsorbing sleeve 22 with a cross-section in the shape of an approximately semi-circular arc for use in a duct having a correspondingly shaped recess (not shown). Such an open cross-section may be used where it is necessary for the hydrocarbon-adsorbing sleeve to fit into a position in a duct where design considerations (an opening in the duct's sidewall for an adjoining duct, for example) prevent a recess and sleeve from extending around the entire circumference of the duct. The thermoforming process and/or the use of stiffening features and/or alignment/orientation features (as described above) allows a sleeve with an open cross-section (such as the illustrated circular arc) to have sufficient structural integrity. Sleeve 22 is shown as comprising an inner sheet 22i and an outer sheet 22o, but the two-sheet construction is by way of example only, as any number and/or thickness of sheets may be used.

Figure 12:
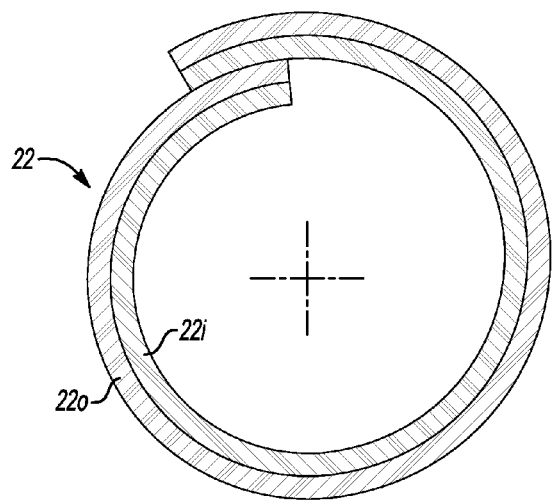
FIG. 12 shows a hydrocarbon-adsorbing sleeve formed from two layers of material with ends of the sleeve overlapping one another.

FIG. 12 schematically illustrates a possible embodiment of a hydrocarbon-adsorbing sleeve 22 with a generally circular cross-section and formed from two layers or sheets (an inner sheet 22i and an outer sheet 22o) of material. The edges of the resulting sleeve overlap one another and are joined or bonded together at that location by the thermoforming process. The thicknesses of the layers are exaggerated for clarity and the thermoforming process would preferably compress the layers in the area of the overlap to achieve a secure bond. After thermoforming, the discontinuity in overall thickness of the sleeve in the area of the overlap would preferably be so small as to not adversely affect the fit of the sleeve 22 into a recess. The two-sheet construction shown is by way of example only, as any number and/or thickness of sheets may be used.

Figure 13:
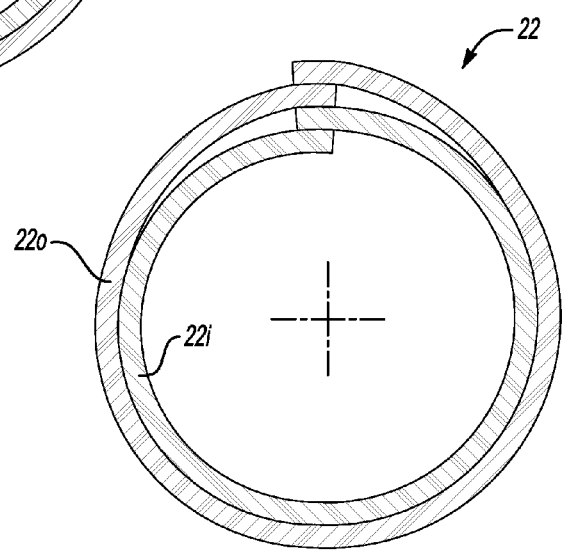
FIG. 13 shows a hydrocarbon-adsorbing sleeve formed from two layers of material with ends of the individual layers overlapping one another.

FIG. 13 illustrates another possible embodiment of a multilayer hydrocarbon-adsorbing sleeve 22 with adjacent edges of the individual layers or sheets 22i, 22o interleaved with one another and bonded together at the overlaps by the thermoforming process. The thicknesses of the layers are exaggerated for clarity and the thermoforming process would preferably compress the layers in the area of the overlap to achieve a secure bond. After thermoforming, the discontinuity in overall thickness of the sleeve in the area of the overlap would preferably be so small as to not adversely affect the fit of the sleeve 22 into a recess. The two-sheet construction shown is by way of example only, as any number and/or thickness of sheets may be used.

Figure 14:
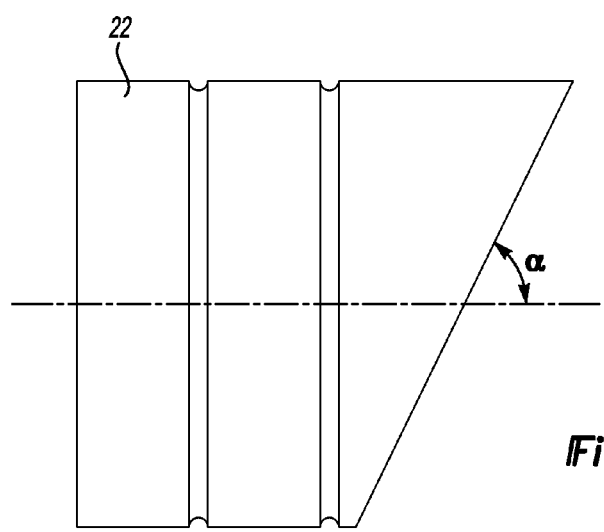
FIG. 14 shows a hydrocarbon-adsorbing sleeve having an end formed at an oblique angle.

FIG. 14 illustrates a further embodiment of a hydrocarbon-adsorbing sleeve 22 with one end forming an oblique angle α with respect to the axial centerline of the sleeve. Such a configuration may be necessary, for example, to permit the sleeve to fit into a position close to a bend or other discontinuity in a duct (not shown). The thermoforming process allows either end of a sleeve to be formed at any angle required to fit a desired duct location and/or geometry.

Some models of a particular vehicle or powertrain may require the use of a hydrocarbon trap to meet emissions requirements, while other models may not have such a requirement. It is possible to use a common air intake system as disclosed herein on multiple vehicle and/or engine models, with the models requiring lower emissions being fitted with a hydrocarbon-adsorbing sleeve and those having less strict emissions requirements being fitted with a so-called "blanking" sleeve which does not contain hydrocarbon-adsorbing material. The blanking sleeve is geometrically identical to the sleeve containing hydrocarbon-adsorbing material. In this way, a vehicle or powertrain program may use a common duct or ducts (saving on tooling investment) and the internal geometry of the two versions (HC vapor trap and blanking sleeve) being identical so that air intake flow does not differ between the versions.

The ducts and sleeves are shown as being circular in cross-section solely for simplicity of description, as the components may be of any cross-sectional shape necessary to fit the design constraints of the air induction system. Such constraints may, for example, include the available space within the engine compartment, the required amount of intake air flow, and the required amount of HC adsorption capability. For example, the ducts and sleeve may be oval, ovoid, or polygonal in cross-section and may vary and/or be irregular in cross-sectional shape and/or area along their respective lengths. Also, the sleeve may extend around less than the entire circumference or perimeter of the interior of a duct in which it is installed, as shown in FIG. 11 for example. The use herein of terms such as "axial," "circumferential," and "radial" is not intended to limit the invention to ducts having circular cross-sections.

The disclosed design eliminates the additional components (such as a cage used to support the hydrocarbon-adsorbing material) and/or manufacturing steps (such as heat staking) necessary in previous designs to provide support, rigidity, assembly, attachment, retention, alignment, and/or orientation for the hydrocarbon-adsorbing media. Features can be thermoformed integrally with the sleeve for stiffening, attachment, retention, alignment, and orientation. In addition or alternatively, hooks can be molded separately, inserted, and attached to the HC vapor trap and/or first duct and/or second duct as separate molded components. The thermoformed surface and/or edge with compressed edges improves the structural rigidity and allows the sleeve to fit into engagement with hooks formed on the ducts with no impairment of flow The thermoformed sleeve allows the sleeve to be shaped with a wide range of internal & external shapes as necessary to mate with the duct in which it is housed. For example, neither tube end needs to be perpendicular to the tube centerline axis. The design results in a simpler construction and is easier to geometrically scale than prior designs. It allows for a more reliable and repeatable manufacturing assembly process, with fewer parts to assemble. Improved quality is achieved with fewer parts to assemble. It also allows contouring of the sleeve to mate with internal and/or external irregular shaped surfaces.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Apparatus comprising:
    a first duct having an interior recess adjacent an end thereof, the recess having a blind end;
    a second duct overlapping the first duct end and closing off a second recess end; and
    a hydrocarbon-adsorbing sleeve inside the recess and having a first edge adjacent the blind end and a second edge adjacent the second with a flange thereof fitting between the first end and an interior surface of the second duct.

2. The apparatus according to claim 1 wherein overlapping portions of the first duct and the second duct adjacent to the flange are welded together.

3. The apparatus according to claim 1 wherein the sleeve further comprises a depression formed in at least one of an outer and inner surface of the sleeve.

4. The apparatus according to claim 3 wherein the depression is formed in an outer surface and matingly engages a feature projecting from an inner surface of the first duct.

5. The apparatus according to claim 4 wherein the feature projecting from the inner surface of the first duct is a clearance feature for an obstruction exterior to the first duct.

6. The apparatus according to claim 1 wherein the sleeve further comprises a protrusion protruding from at least one of an outer surface and an inner surface thereof.

7. The apparatus according to claim 6 wherein the protrusion protrudes from the outer surface and matingly engages a complementally-shaped feature in an inner surface of at least one of the ducts.

8. The apparatus according to claim 1 wherein the first duct comprises a hook overlapping a portion of the blind end of the recess to form a pocket receiving the first edge of the sleeve.

9. The apparatus according to claim 8 wherein the sleeve has a relief around at least a portion of an inner surface adjacent the second edge, the hook and the relief overlapping one another.

10. The apparatus according to claim 1 wherein the first duct has a protrusion extending into the recess and the sleeve has a retaining feature in mating engagement with the protrusion.

11. A hydrocarbon trap assembly, comprising:
    a first duct having an interior recess adjacent an end thereof and a first hook extending over at least a portion of a blind end of the recess to form an axially-extending first pocket at the blind end of the recess;
    a second duct joined to the end of the first duct to close off a second end of the recess and form a gap between the end of the first duct and an interior surface of the second duct overlapping the end of the first duct; and
    a thermoformed hydrocarbon-adsorbing sleeve inside the recess and having a first edge disposed in the first pocket and a second edge having a radially-outward extending flange fitting into the gap.

12. The assembly according to claim 11 wherein overlapping portions of the ducts adjacent to the gap are welded together.

13. The assembly according to claim 11 wherein the sleeve further comprises a thermoformed stiffening feature.

14. The assembly according to claim 13 wherein the stiffening feature comprises a depression formed in an outer surface of the sleeve, and the first duct has a feature projecting from an inner surface of the recess into mating engagement with the depression.

* * * * *